(12) United States Patent
Hayward (10) Patent No.: US 6,932,346 B1
(45) Date of Patent: Aug. 23, 2005

(54) METHOD FOR INSTALLING A PROTECTIVE GAITER AROUND A JOINT (76) Inventor: Phillip Fields Hayward, Unit 8, Chorley North Industrial Park, Lancashire, PR6 7BX (GB)

( * ) Notice: Subject to any disclaimer, the term of this patent is extended or adjusted under 35 U.S.C. 154(b) by 0 days.

(21) Appl. No.: 10/031,562

(22) PCT Filed: Apr. 26, 2000

(86) PCT No.: PCT/EP00/04385

§ 371 (c)(1),
(2), (4) Date: Jun. 17, 2002

(87) PCT Pub. No.: WO00/65254

PCT Pub. Date: Nov. 2, 2000

(30) Foreign Application Priority Data

Apr. 26, 1999 (GB) .................................. 9909512
Jul. 14, 1999 (GB) .................................. 9916441

(51) Int. Cl.$^7$ .............................. F16J 15/50; F16J 3/00
(52) U.S. Cl. ...................... 277/315; 277/634; 277/635
(58) Field of Search ............................. 277/634, 635, 277/636; 464/175

(56) References Cited

U.S. PATENT DOCUMENTS 4,878,389 A * 11/1989 Boge .......................... 277/636
5,015,002 A * 5/1991 Goodman et al. .......... 277/636
5,222,466 A * 6/1993 Gratziani .................. 123/193.6
5,599,029 A * 2/1997 Umeno ........................ 277/636
6,227,748 B1 * 5/2001 Hayward et al. ............. 403/50
6,237,732 B1 * 5/2001 DeLeeuw et al. ....... 188/205 R

FOREIGN PATENT DOCUMENTS

GB      2320067      *  6/1998

OTHER PUBLICATIONS

IBM Technical Disclosure Bulletin, Jul. 1984, US (vol. 27, issue No. 2, p. 1232-1233).*

* cited by examiner

Primary Examiner—Alison Pickard
Assistant Examiner—Vishal Patel
(74) Attorney, Agent, or Firm—Pearson & Pearson, LLP (57) ABSTRACT

A method of installing a gaiter (10) around a joint defined between joint members of joints of vehicles, such as steering joints and constant velocity joints. The method provides a range of gaiters for use with a range of joints of different dimensions, the range of joints being greater than the range of gaiters and at least some of the gaiters (10) in the said gaiter range being stretchable to fit two or more joints of the said joint range so the said joint range can be accommodated by the range of gaiters wherein a gaiter is selected from the gaiter range to fit a particular joint.

22 Claims, 7 Drawing Sheets

METHOD FOR INSTALLING A PROTECTIVE GAITER AROUND A JOINT

This invention relates to a method for installing a protective gaiter around a joint.

Flexible rubber gaiters are used in motor cars to protect constant velocity joints and joints defined between steering racks and track rods or their housings, so as to prevent the ingress of dirt and moisture and the egress of lubricants.

These gaiters customarily comprise one-piece moulded tubes having cylindrical end portions suitably diametered to fit the pertaining joint members and a convoluted central portion which can flex to allow bending and change of length.

To allow for the fact that such joints of different motor car models usually have different dimensions, it has been found necessary to provide a corresponding range of differently dimensioned gaiters. However, due to the manufacturing costs of producing a comprehensive range of gaiters and the inconvenience of maintaining stocks of the different gaiters, gaiters have been developed having end portions adapted by the provision of multiple fitting sections allowing attachment to a number of different diameters of joint members.

Whilst generally satisfactory, because the end portions can represent significant parts of the length of the gaiter, limitations in the flexibility of such portions can impose limitations on the overall flexibility of the gaiter.

Gaiters with shortened fitting sections have been developed which improve the overall flexibility of the gaiter. However these shortened fitting sections are difficult to attach securely to joint members, with the result that such gaiters can become dislodged more easily.

An object of the present invention is to eliminate or at least minimise the above outlined problems.

According to the invention therefore there is provided a method of installing a gaiter around a joint defined between joint members the method comprising providing a range of gaiters for use with a range of joints of different dimensions, the range of joints being greater than the range of gaiters and at least some of the gaiters in the said gaiter range being stretchable to fit two or more joints of the said joint range so the said joint range can be accommodated by the range of gaiters wherein a gaiter is selected from the gaiter range to fit a particular joint.

With this arrangement a reduced range of gaiters can be used (and manufactured and stocked) to accommodate a large range of differently dimensioned joints, whilst at the same time the overall flexibility of each gaiter in the range is maintained.

The joint range may include any number of joints and may comprise one or more types of joint. Thus, the joint range may comprise only steering joints or only constant velocity joints. Alternatively, however the joint range may comprise a combination of steering and constant velocity joints.

Each joint may take any form, preferably being defined between first and second members, which in the case of a steering joint, may be a steering rack and track rod (respectively).

Preferably, each gaiter of the said range of gaiters comprises a flexible tubular body having first and second ends and a central portion therebetween the said ends being configured for secure attachment to respective first and second joint members.

The gaiter body may take any suitable shape, and may be conically tapered (such that the body is generally cone shaped or has one or more conically tapered portions e.g. end portions) or it may be generally cylindrical. The gaiter may incorporate a central portion having folds therein to permit axial extension of the body.

Each end portion of at least one gaiter of the said gaiter range may incorporate a respective single annular fitting section or channel. Thus the flexibility of the gaiter is optimised.

However, the gaiter range may include at least one gaiter having a plurality of seating channels at one or each end portion.

At least one gaiter of the gaiter range may be dimensioned to fit exactly, without any substantial stretching of the gaiter, one or more of the range of joints whilst also being stretchable to fit other joints in the joint range. To this end, preferably, the wall of said at least one gaiter is configured and dimensioned to provide the requisite stretch characteristics for a given range of joint member dimensions.

Accordingly, the wall of said at least one gaiter preferably has, throughout, a maximum thickness of approximately 3 mm.

Preferably, the said at least one gaiter has stretch characteristics to accommodate the process of fitting the gaiter. In some cases the joints are configured such that the free ends of joint members are enlarged relative to the portion of the joint member at which the gaiter is fixed and so the gaiter must be stretchable over such enlarged joint ends and a fitting cone or any other fitting device, and then able to contract to fit about the joint member shaft. The wall thickness of the end portions of gaiters for installing on such joints is particularly critical.

Accordingly, the wall thickness of one or more gaiters in the gaiter range may be approximately 2 mm.

Alternatively or additionally, the said at least one gaiter maybe formed from a synthetic rubber compound formulated to provide a minimum stretch of 550% "at break" (i.e. under a standard destructive rubber testing procedure in which the rubber is stretched until breaking point).

With this arrangement, a gaiter can be stretched-manually (by e.g. a mechanic) without undue force temporarily, i.e., during fitting, so as to a accommodate enlarged end portions of joint members or to stretch over a fitting device such as a standard fitting cone without dismantling the joint.

Preferably, the said at least one gaiter has stretch characteristics to accommodate prolonged installation in position about a joint.

Accordingly, one or both end portions of the said at least one gaiter are permanently stretchable to a diameter which is 115% of the respective (unstretched) end portion diameter, wherein the stretching of the gaiter results in no more than a 10% change in the properties of the gaiter rubber (the salient properties being tensile strength, elongation "at break", hardness and compression set).

With this arrangement, the gaiter can be fitted in a stretched state for prolonged periods without any consequential acceleration of chemical/mechanical aging/deterioration of the material.

At least some of the gaiters in the said gaiter range may be formed from a synthetic rubber compound which is formulated so that the gaiter is also compressible to fit two or more joints of the joint range.

Further preferably, one or both end portions of the said at least one gaiter (of the gaiter range) are radially compressible. The gaiter then may be compressed (by means of an appropriate fastening strap, clip, etc.) to fit on the joint member.

Preferably, the said one or both end portions are radially compressible to a compressed diameter which is 98% of the (uncompressed) respective end portion diameter, and particularly preferably, the compressed end portion and in particular, the pertaining fitting section retains a substantially circular cross-section. With this arrangement the compression does not result in substantial flexing, creasing or distortion of the fitting section which could otherwise lead to leakage of lubricant, etc., therefrom.

Most preferably, the gaiter is stretchable in all directions, and is at least stretchable longitudinally and transversely (relative to the longitudinal axis of the gaiter).

The gaiter may however be formed from any other suitable stretchable material, such as natural rubber.

The gaiter may be moulded in one piece.

The said end portions of one or more gaiters of the gaiter range may incorporate one or more internal and/or external ribs or beads which may extend wholly or partially around the circumference of a respective end portion of the said one or more gaiters.

With this arrangement the strength of the end portions of the gaiter may be enhanced whilst not unduly interfering with the desired stretchability of these portions.

The wall thickness of the gaiters in the gaiter range may be constant, alternatively, one or more gaiters may incorporate a gaiter wall which varies in thickness to alter the flexing characteristics of the respective gaiter(s).

It will be immediately evident from the above description that the gaiter range may comprise any suitable combination of gaiters in order that the gaiter range can be used to accommodate the particular joint range.

According to a second aspect of the invention, there is provided a gaiter for use in the above mentioned method wherein the gaiter is stretchable to fit two or more joints in a joint range.

The preferred features of the above gaiter are described above in relation to the gaiter range for use in the method of the first aspect of the invention.

Once positioned on the joint members, the said first and second ends of the gaiter may be secured to the respective first and second joint members in any suitable manner, for instance using ties, straps or clips.

The invention will now be described further by way of example only and with reference to the accompanying drawings in which.

Figure 1:
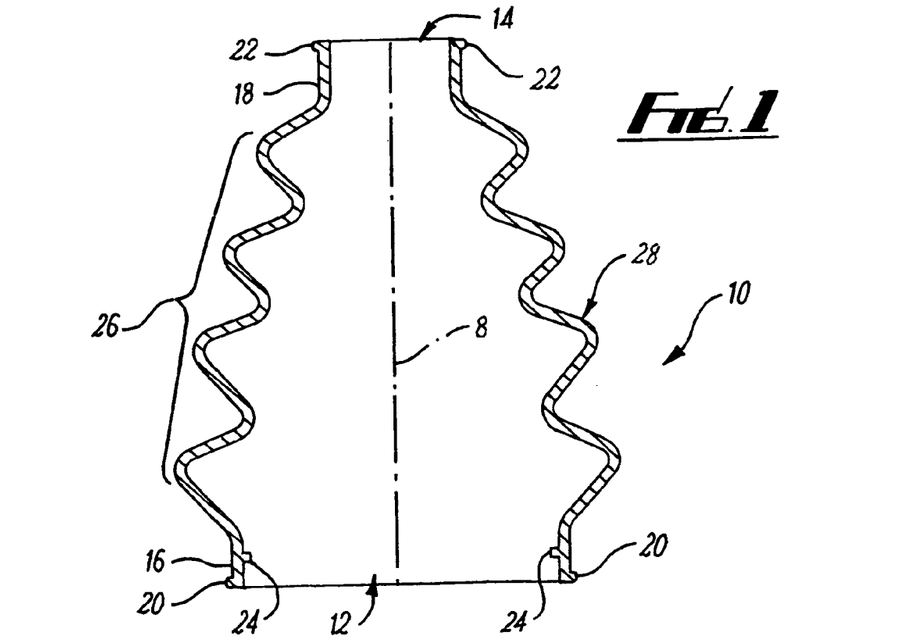
FIGS. 1–8 are sectional side views of gaiters of one form of gaiter range according to the invention, the gaiter range being for use with a range of constant velocity joints.
Figure 2:
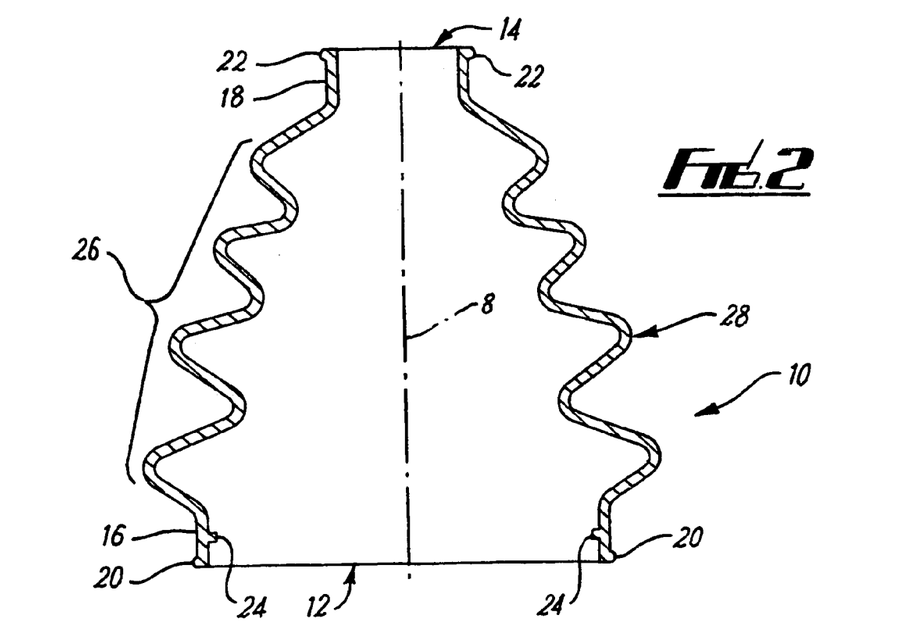
Figure 3:
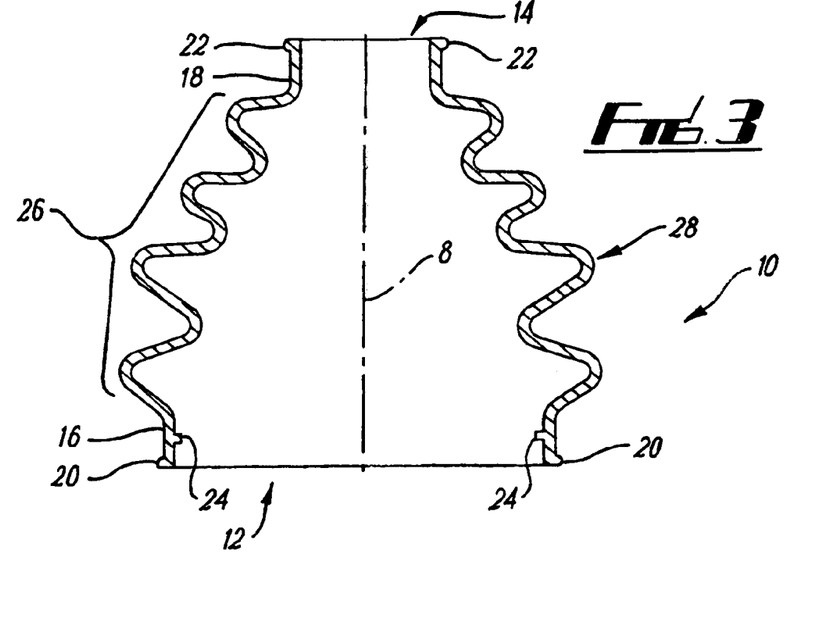
Figure 4:
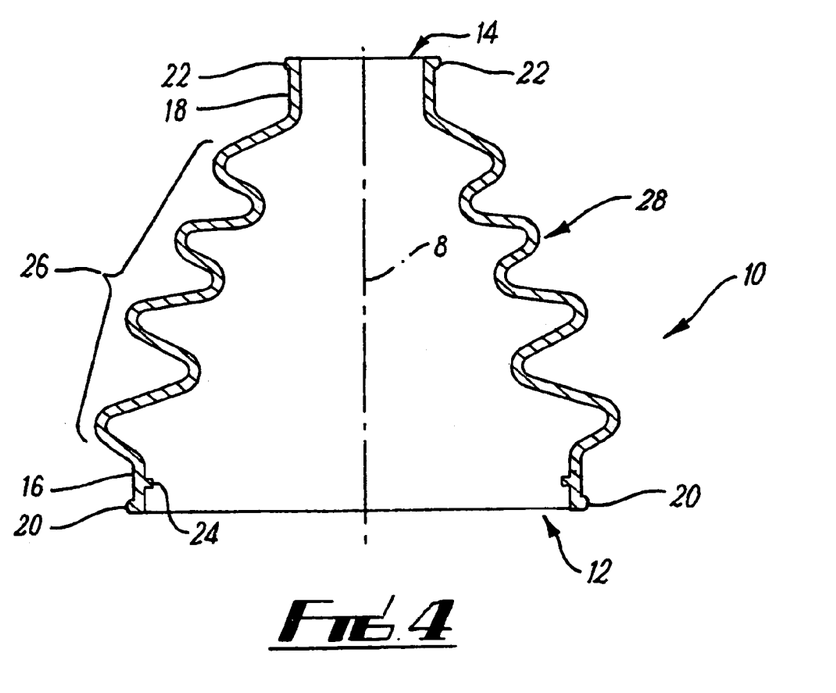
Figure 5:
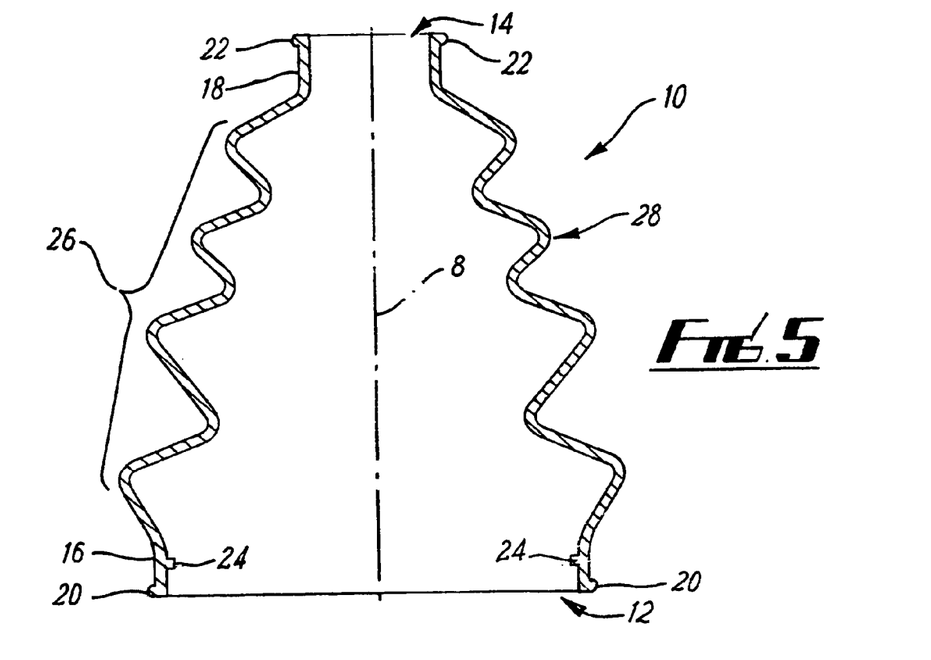
Figure 6:
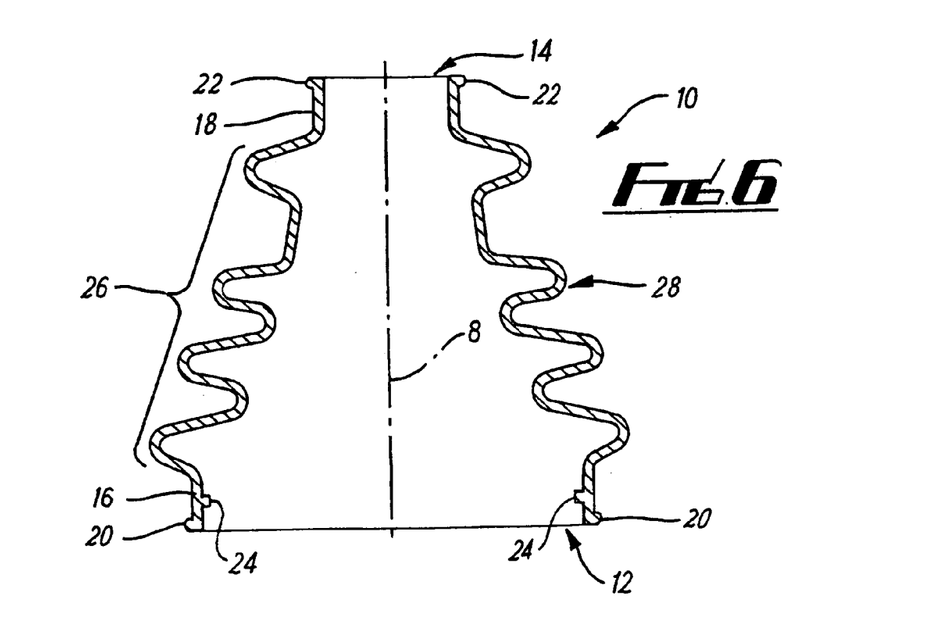
Figure 7:
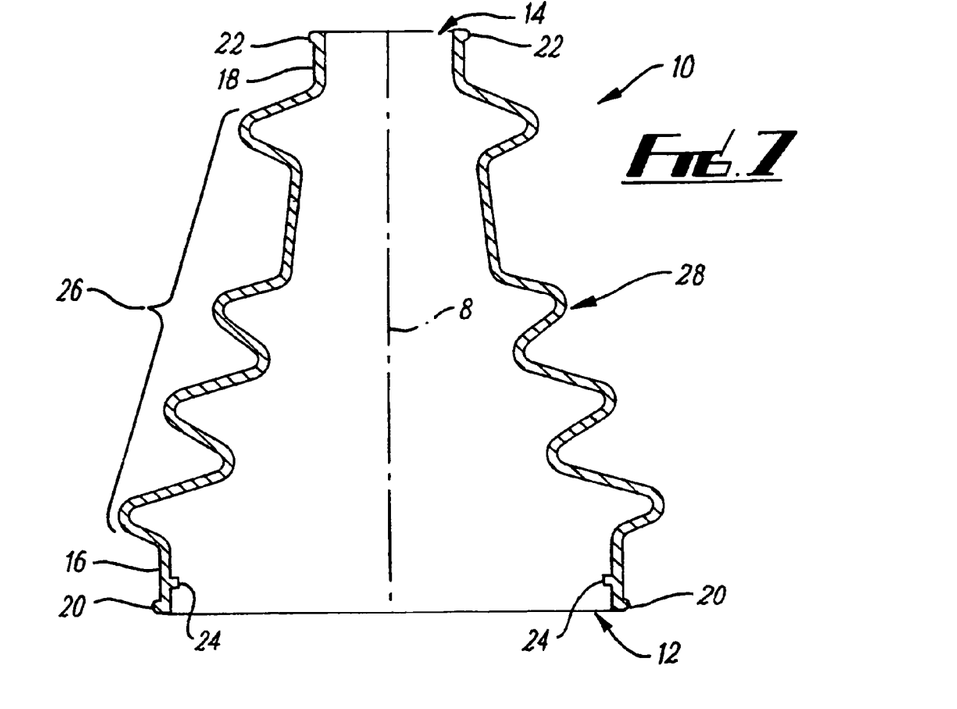
Figure 8:
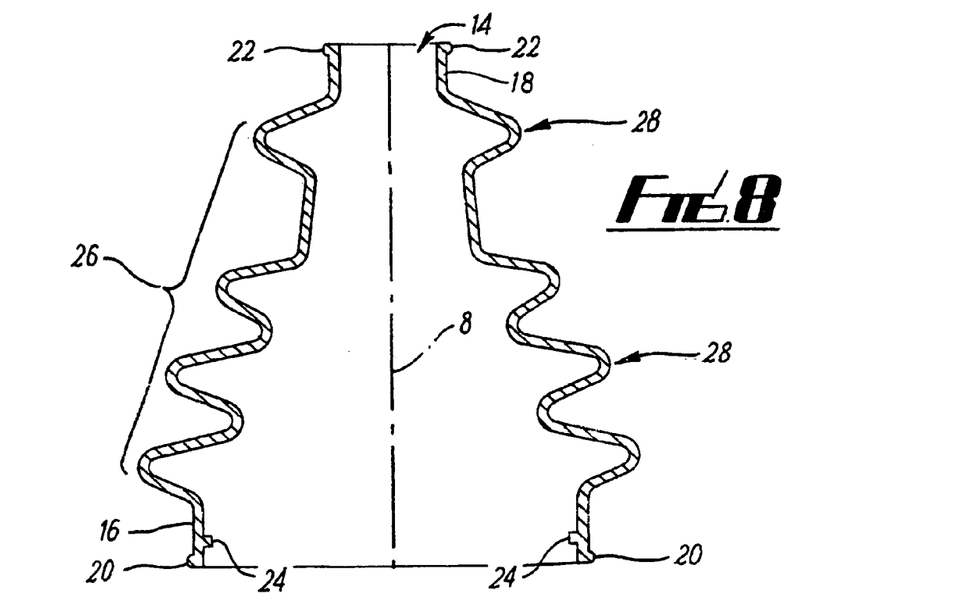

The gaiter 10 of FIG. 1 comprises a one-piece moulded rubber tubular body of generally frusto-conical form having two end portions; a wider end portion 12 and a narrow end portion 14.

These end portions 12 and 14 incorporate respective annular fitting sections 16 and 18 which are flat when viewed in cross section. These sections are suitably configured and adapted such that a relatively large amount of flexibility is permitted therein both transversely of and parallel to the tube axis 8. On its outer surface each annular fitting section 16 and 18 is bounded at each free end by respective circumferential ribs 20 and 22. On its inner surface, the wider end annular fitting section 12 has a radially projecting circumferential rib 24.

The central portion 26 of the gaiter is formed into multiple convolutions or folds 28 which allow this section to flex and also to extend axially.

With the gaiter 10 formed as above it will be appreciated that such gaiter is readily flexible along the entire length of the tubular body and not solely in the region of the central portion 26 thereof.

The gaiter has a constant wall thickness of 2 mm except where the radius of a fold is 4.5 mm and above where the wall thickness increases marginally. Notwithstanding this variation, the wall thickness of the gaiter does not exceed 3 mm at any point.

Importantly, the wall thickness and rubber stretch characteristics allows for the gaiter to fit a number of joints either exactly or by stretching of the gaiter by means of its stretchability (primarily at the end portions which will, for many joints have to stretch over fitting devices such as fitting cone and enlarged joint member ends and then contract to fit in the desired position on the joint member shaft.

The gaiter is formed from a synthetic, e.g. neoprene rubber compound formulated to provide a minimum stretch of 550% "at break", (that is, under a standard destructive rubber testing procedure which is well known to those skilled in the relevant field of technology). With this arrangement, a gaiter can be stretched manually (by e.g. a mechanic) without undue force temporarily, i.e., during fitting, so as to a accommodate enlarged end portions of joint members or to stretch over a fitting device such as a standard fitting cone without dismantling the joint (other than to disconnect the joint members from each other).

In addition the gaiter has stretch characteristics to accommodate prolonged installation in position about a joint.

Accordingly the end portions of each gaiter in the range shown can stretch to give 115% increase in the respective end portion diameter, wherein the stretching of the gaiter results in no more than a 10% change in the properties of the gaiter rubber (the salient properties being tensile strength, elongation "at break", hardness and compression set).

With this arrangement, the gaiter can be fitted in a stretched state for prolonged periods without any consequential acceleration of chemical/mechanical aging/deterioration of the material.

In addition, the synthetic, e.g. neoprene rubber compound is formulated to also allow compression of the gaiter walls so that the end portions of each gaiter are radially compressible to 98% of the respective (uncompressed) end portion diameter wherein the compressed end portion retains a substantially circular cross section. With this arrangement the compression does not result in substantial flexing, creasing or distortion of the fitting section which could otherwise lead to leakage of lubricant, etc., therefrom. Thus, these gaiters can also be compressed (by fixing ties or clips) to fit about joint members which are slightly smaller in diameter than the respective gaiter end portions.

The gaiter is secured in position by clamping the end sections to respective joint members of a constant velocity joint (not shown) using ties or circlips or other conventional securing means which are maintained in position on respective annular seating channels by the ribs 20,22.

FIGS. 2–8 show the remaining gaiters of the gaiter range (and like reference numerals are used for like parts).

The gaiter range is by the combination of compressiblity and stretchability able to accommodate a range of joints comprising the constant velocity joints of all European (including UK), and Japanese motor car models in the current UK 'car parc' (a term which will be understood by the skilled man in this field as referring to all commercially, freely available models). The gaiter range can of course be updated to accommodate the changing car parc.

The gaiter range shown has enormous advantages. By means of the particular combination of dimensional characteristics and compressibility/stretchability of the gaiters in the range, this small range can be used to accommodate the great range of joint members of motor vehicle models as defined above, thereby reducing the associated manufacturing and storage costs involved whilst, at the same time, the overall flexibility of each gaiter in the range is optimised.

Figure 9:
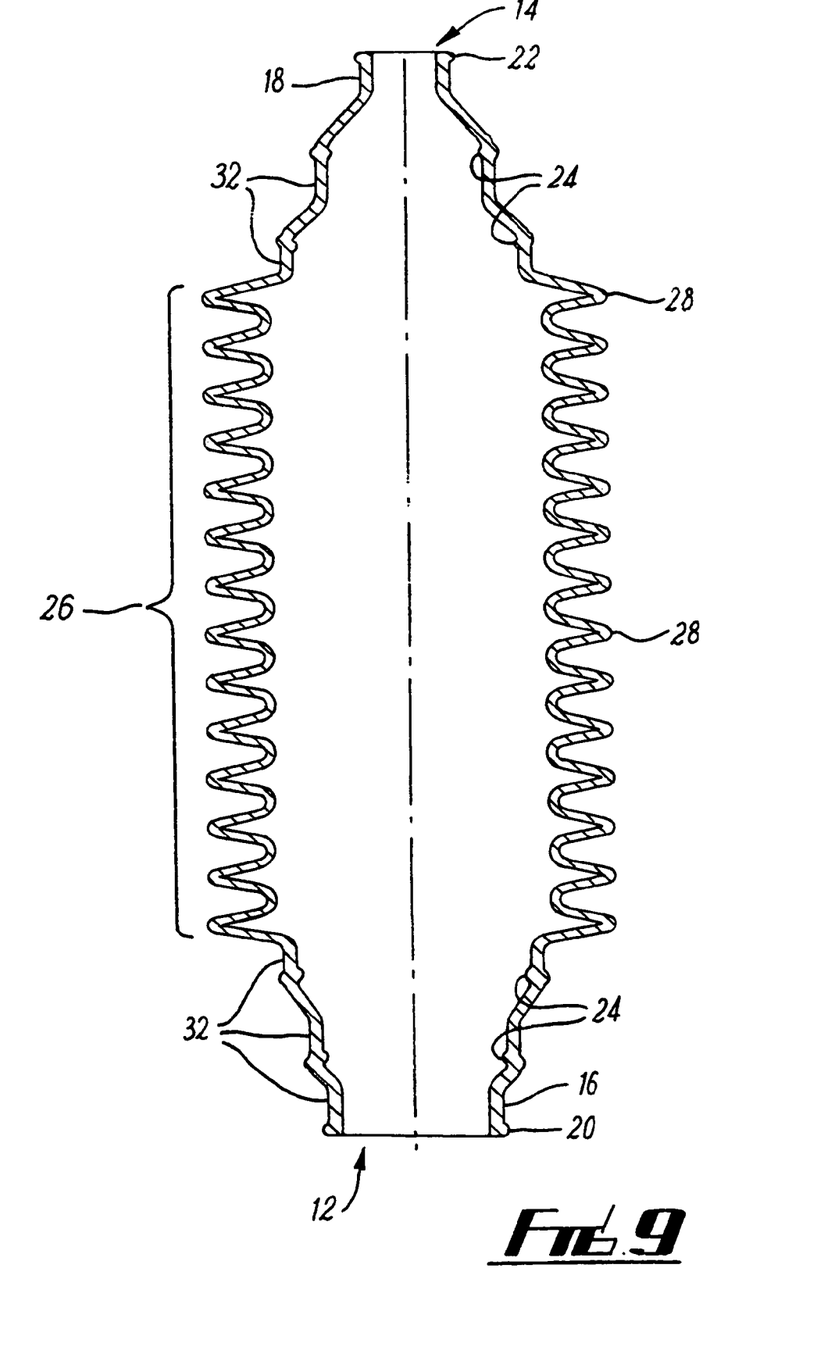
FIGS. 9–11 are sectional side views of gaiters of another form of gaiter range according to the invention, the gaiter range being for use with a range of steering joints.
Figure 10:
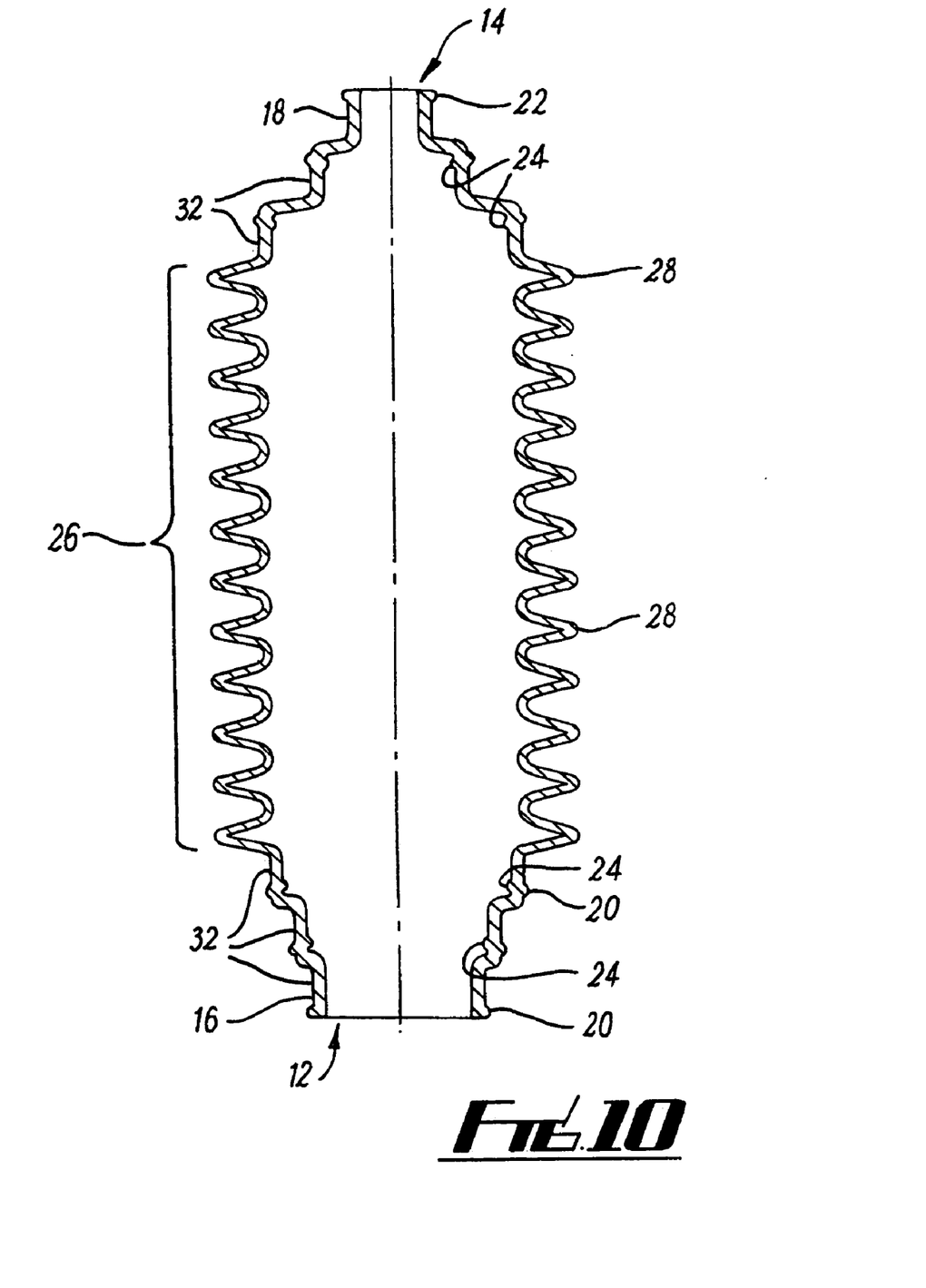
Figure 11:
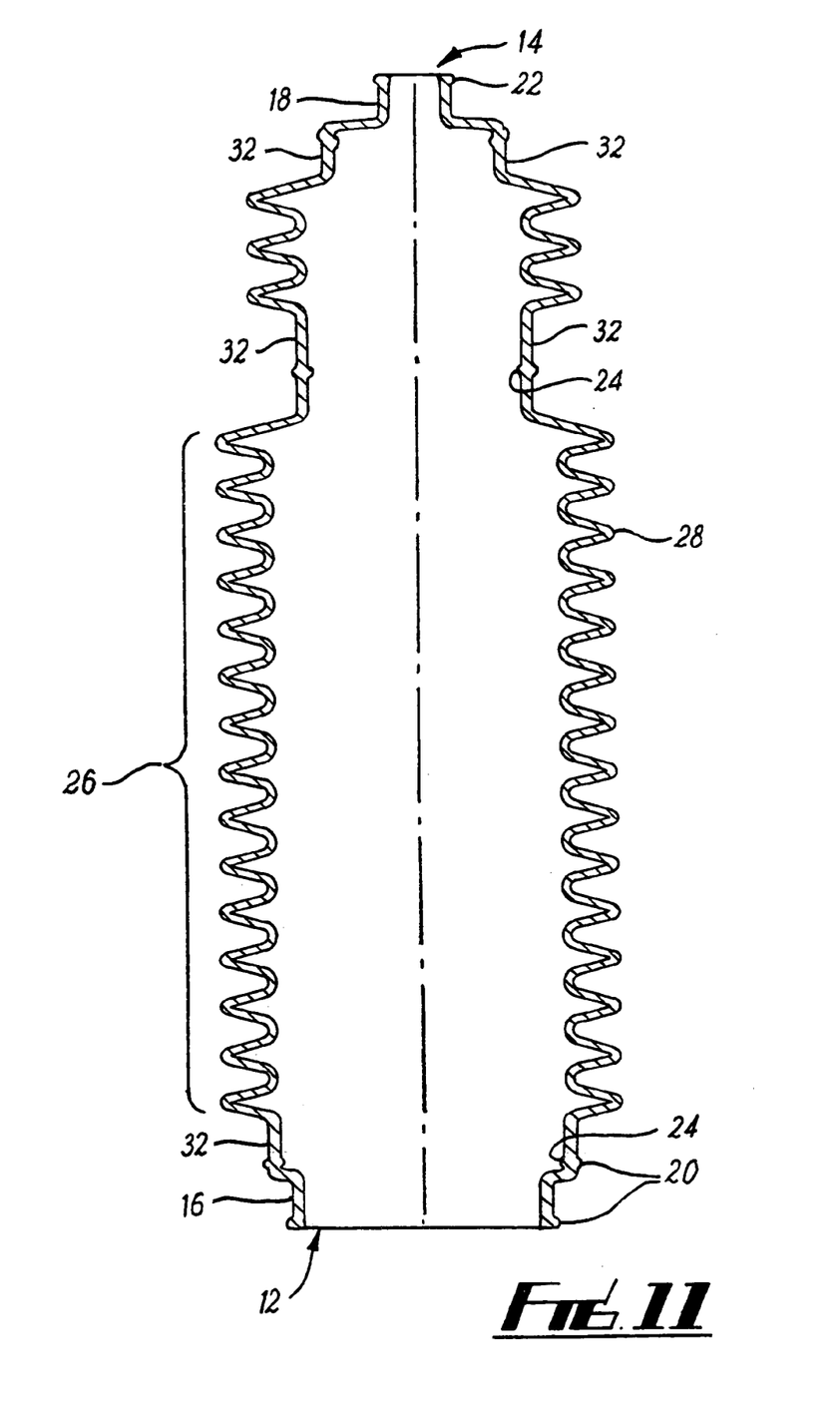

FIGS. 9–11 show the gaiters of a gaiter range which is used to accommodate a range of steering joints (not shown) which corresponds with the above defined range of constant velocity joints. The features are as described for the above range of gaiters (again, like reference numerals are used for like parts).

The gaiters of the second range each have additional seating areas 32 and associated ribs thereon, thereby reducing the range to comprise only three gaiters. The length of these gaiters may be adjusted by cutting the end portion along the outer edge of the additional seating area 32. One or more of the gaiters of the second range could, alternatively, comprise single annular seating channels at one or both end portions without greatly increasing the range of gaiters necessary to accommodate the range of steering-gaiters defined above.

It is of course to be understood that the invention is not to be intended to be restricted to the details of the above embodiment which are described by way of example only.

What is claimed is:

1. A method of installing gaiters around a range of joints defined between joint members having different dimensions, the method comprising the steps of providing a range of gaiters having different dimensions in which each end portion of at least one gaiter of the said gaiter range incorporates a respective single annular fitting section or channel, the range of joint dimensions being greater than the range of gaiter dimensions, providing at least some of the gaiters in said gaiter range that are permanently stretch to a diameter which is 115% of the respective unstretched end portion diameter in order to fit two or more joints of the said joint range so the said joint range can be accommodated by the range to fit a particular joint, and applying respective gaiters around the joints such that two or more joints of different dimensions have applied thereto gaiters having the same dimensions and which are stretchable as aforesaid.

2. The method according to claim 1 wherein each joint is defined between first and second members and each gaiter of the said range of gaiters comprises a flexible tubular body having first and second end portions and a central portion therebetween the said end portions being configured for secure attachment to respective first and second joint members.

3. The method according to claim 1 in which each gaiter incorporates a central portion having folds therein to permit axial extension of the gaiter body.

4. The method according to claim 1 in which the gaiter range includes at least one gaiter having a plurality of seating channels at one or each end portion.

5. The method according to claim 1 in which at least one gaiter of the gaiter range is dimensioned to fit exactly, without any substantial stretching of the gaiter, one or more of the range of joints while also being stretchable to fit other joints in the joint range.

6. The method according to claim 1 in which a wall of said at least one gaiter is configured and dimensioned to provide the requisite stretch characteristics for a given range of joint member dimensions.

7. The method according to claim 1 in which at least one gaiter has a wall having throughout, a maximum thickness of approximately 3 mm.

8. The method according to claim 1 in which at least one gaiter has stretch characteristics to accommodate the process of fitting the gaiter.

9. The method according to claim 1 in which one or more gaiters in the gaiter range have a wall thickness of approximately 2 mm.

10. The method according to claim 1 in which at least one gaiter may be formed from a synthetic rubber compound formulated to provide a minimum stretch of 550% at break.

11. The method according to claim 1 in which at least one gaiter has stretch characteristics to accommodate prolonged installation in position about a joint.

12. The method according to claim 1 in which at least one gaiter may be formed from a synthetic rubber compound and wherein one or both end portions of at least one gaiter are permanently stretchable to a diameter which is 115% of the respective (unstretched) end portion diameter, wherein the stretching of the gaiter results in no more than a 10% change in the properties of the rubber compound.

13. The method according to claim 1 in which at least some of the gaiters in the said gaiter range are formed from a synthetic rubber compound which is formulated so that the gaiter is also compressible to fit two or more joints of the joint range.

14. The method according to claim 1 in which one or both end portions of at least one gaiter of the gaiter range are radially compressible.

15. The method according to claim 1 in which said one or both end portions are radially compressible, such that the compressed end portion and, in particular, the pertaining fitting section retains a substantially circular cross-section.

16. The method according to claim 1 in which each gaiter of the range is stretchable in all directions, and is at least stretchable longitudinally and transversely relative to the longitudinal axis of the gaiter.

17. The method according to claim 1 in which said end portions of one or more gaiters of the gaiter range incorporate one or more internal or external ribs or beads which extend wholly or partially around the circumference of a respective end portion of said one or more gaiters.

18. The method according to claim 1 in which the wall thickness of the gaiters in the gaiter range is constant.

19. The method according to claim 1 in which one or more gaiters of the range incorporate a gaiter wall which varies in thickness to alter the flexing characteristics of the respective gaiter(s).

20. A gaiter suitable for use in the method of claim 1 wherein the gaiter is stretchable to fit two or more joints of a joint range.

21. A method of installing gaiters around a range of joints defined between joint members having different dimensions, the method comprising the steps of providing a range of gaiters having different dimensions, of the kind having a tubular body part and opposite end portions each tapered in a direction away from the body portion, for use with a range of joints of different dimensions, the range of joints being greater than the range of gaiter dimensions, providing at least some of the gaiters in said gaiter range that are permanently stretch to a diameter which is 115% of the respective unstretched end portion diameter in order to fit two or more joints of the said joint range, and applying respective gaiters around the joints such that two or more joints of different dimensions have applied thereto gaiters having the same dimensions and which are stretchable as aforesaid.

22. The method according to claim 21 wherein each joint is defined between first and second members and each gaiter of the said range of gaiters comprises a flexible tubular body having first and second end portions and a central portion therebetween the said end portions being configured for secure attachment to respective first and second joint members.

* * * * *